(No Model.)
H. LAU.
ADJUSTABLE AXLE FOR CARS.
No. 457,786. Patented Aug. 18, 1891.
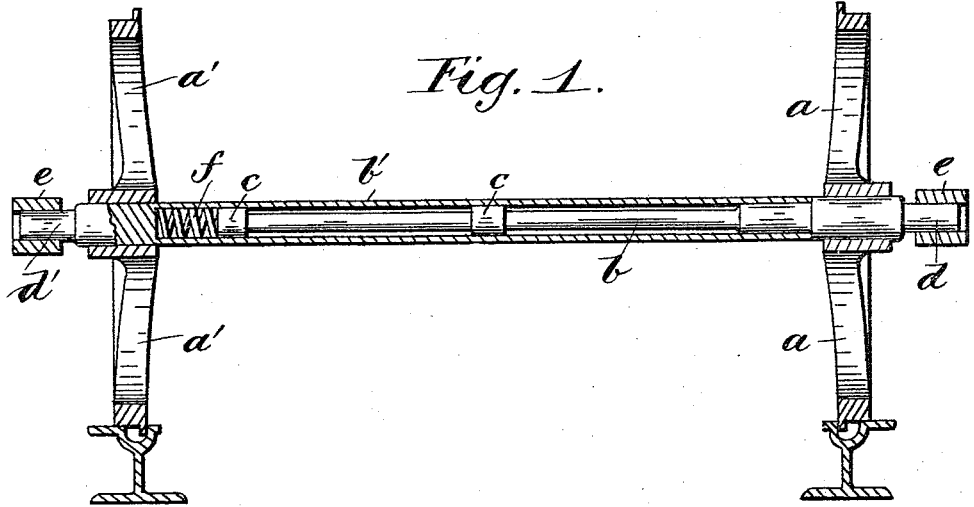
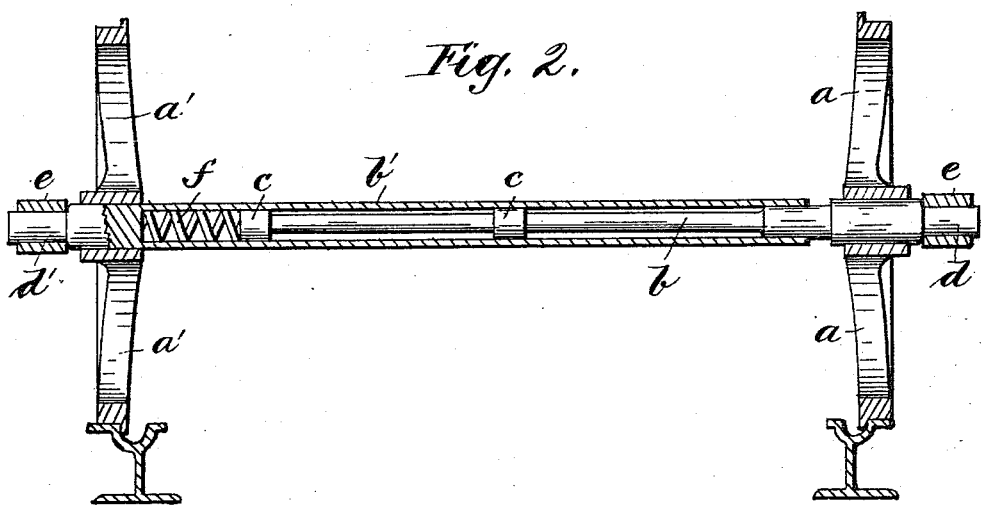
Witnesses:
H. B. Kingsbery
C. S. Northup
Inventor:
Hugo Lau,
by William E. Poulter
attorney

United States Patent Office.

HUGO LAU, OF DRESDEN, GERMANY.

ADJUSTABLE AXLE FOR CARS.

SPECIFICATION forming part of Letters Patent No. 457,786, dated August 18, 1891.

Application filed March 30, 1891. Serial No. 387,063. (No model.)

*To all whom it may concern:*

Be it known that I, HUGO LAU, a subject of the King of Saxony, residing at Dresden, Saxony, in the German Empire, have invented certain new and useful Improvements in Adjustable Axles for Railway-Carriage Wheels, of which the following is a specification.

At present vehicles running on rails or tracks, more especially street tram-cars, are apt to slip off the rails, chiefly at curves and turnings, owing to the fact that the rails at these parts gradually alter their position and gage, so that the wheels of the car in passing are forced out of the track. It is proposed to remedy this drawback by the employment of divided axles in the construction of tram-car wheels, such axles being loosely supported by their bearings and having the wheels mounted fast upon them, while they are at the same time, jointly with the wheels, capable of longitudinal adjustment. The wheels are thus enabled to fit exactly the gage, whatever it may be, at any given point or moment, which they will do the more readily, as the variations of gage scarcely ever exceed a few centimeters. In employing such divided axles, adjustable lengthwise, an additional division may be made in order to provide for the varying angles at which the wheels are inclined when running over curves and the like. Where the permanent way is of a light structure the employment of automatically-adjustable axles also offers certain other advantages than those stated above. For instance, the avoidance of the lateral shaking of the car, which is rendered by inertia independent of any deviation of the wheels from the perpendicular.

In the accompanying drawings, Figure 1 is a section of a set of wheels and axle adapted to carry out this invention and showing the wheels near together, and Fig. 2 is a similar view showing the wheels wide apart.

The object of the invention is attained by connecting one wheel $a$ with an axle $b$ of small section integral with the journal $d$, while the other wheel $a'$ is fast upon a hollow axle $b'$ of larger diameter than $b$. The axle $b$ is provided with a number of projections or collars $c$, which when the other axle $b'$ is passed over $b$ make a sufficiently tight fit between the two. The hollow axle $b'$ carries the journal $d'$. Between the solid portion of the hollow axle $b'$ and the solid axle $b$ a spring $f$ may be interposed within the hollow axle, which spring will have the tendency to keep the wheels apart. Both journals $d$ $d'$ are loosely carried in the bearings $e$ $e$ of the car. The wheels thus arranged will readily accommodate themselves to any variation of gage, owing to the movableness of one axle within the other, whereby the journals are moved farther into or out of their bearings, as illustrated by Figs. 1 and 2 of the accompanying drawings.

I claim—

1. A car-axle consisting, essentially, of two sections arranged one within the other, and one of said sections being adapted for longitudinal movement within the other section, in combination with a spring located between the said sections, as described, for the purpose specified.

2. In a car-axle of the class described, the combination, with the section $b$, having a wheel secured thereto short of its outer end to form a journal $d$, of the tubular section $b'$, within which loosely fits and is adapted for longitudinal movement the section $b$, a wheel secured to the section $b'$ short of its outer end to form a journal $d'$, and bearing-boxes, in which said journals fit and are adapted for longitudinal movement, as described, for the purpose specified.

3. In a car-axle of the class described, the combination, with the section $b$, having a wheel secured thereto and provided with the annular shoulders $c$ and the journal $d$, of the section $b'$, of somewhat larger diameter than the section $b$ and fitting over the latter and having a wheel secured thereto and provided with the journal $d'$, the bearing-boxes, in which fit and are adapted for longitudinal movement the journals $d$ $d'$, and the spring $f$, interposed between one of the annular shoulders $c$ and the solid portion of section $b'$, as and for the purpose specified.

In testimony whereof I have hereunto set my hand in presence of two witnesses.

HUGO LAU.

Witnesses:
 RUD. SCHMIDT,
 PAUL DRUCKMÜLLER.